United States Patent
Cloonan et al.

(10) Patent No.: US 6,769,132 B1
(45) Date of Patent: Jul. 27, 2004

(54) SIGNAL SPLITTER MATRIX FOR A CABLE MODEM TERMINATION SYSTEM

(75) Inventors: Thomas J. Cloonan, Lisle, IL (US); Daniel W. Hickey, Oswego, IL (US); Ubaldo Cepeda, Oswego, IL (US); Gerald P. Ryan, Lake Zurich, IL (US)

(73) Assignee: Arris International, Inc., Suwanee, GA (US)

( * ) Notice: Subject to any disclaimer, the term of this patent is extended or adjusted under 35 U.S.C. 154(b) by 575 days.

(21) Appl. No.: 09/660,120

(22) Filed: Sep. 12, 2000

(51) Int. Cl.[7] .............................................. H04N 7/173
(52) U.S. Cl. ............................. 725/111; 375/222
(58) Field of Search ............................. 725/111, 110, 725/109, 114, 116, 117; 370/281, 419, 420, 421, 422, 423; H04N 7/173

(56) References Cited

U.S. PATENT DOCUMENTS

| | | | |
|---|---|---|---|
| 5,842,040 A | | 11/1998 | Hughes et al. |
| 6,018,767 A | | 1/2000 | Fijolek et al. |
| 6,038,303 A | * | 3/2000 | Sanford et al. ......... 379/201.01 |
| 6,137,793 A | * | 10/2000 | Gorman et al. ............. 370/360 |
| 6,230,326 B1 | * | 5/2001 | Unger et al. ................ 725/111 |
| 6,289,377 B1 | | 9/2001 | Lalwaney et al. |
| 6,490,727 B1 | * | 12/2002 | Nazarathy et al. .......... 725/129 |

* cited by examiner

Primary Examiner—Vivek Srivastava

(57) ABSTRACT

In a cable data system, several frequency division multiplexed upstream data signals on an individual cable can be selectively routed to frequency-selective band pass filters using a relay matrix between the filters and the cable. By appropriately controlling the relays, the upstream information can be split out to as many different filters that might be required to recover the frequency division multiplexed information. Cabling installation to a cable modem termination system is simplified and maintenance costs are reduced by carrying multiple signals on one cable.

12 Claims, 2 Drawing Sheets

SIGNAL SPLITTER MATRIX FOR A CABLE MODEM TERMINATION SYSTEM

FIELD OF THE INVENTION

This invention relates to a cable data system by which two-way data communications, such as Internet access, is provided via a cable televisions system. In particular, this invention relates to an improved method and apparatus for connecting the physical cable media to a cable modem termination system (CMTS) so as to expedite installation and, among other things, provide a more serviceable CMTS to maintenance personnel.

BACKGROUND OF THE INVENTION

Cable television systems are well known. In such a system, several different frequency-division multiplexed television channels are distributed to subscribers over a coaxial cable. Each television channel is typically allocated a frequency band, (typically 6 MHz.) in which audio and video information for a television channel is carried. Data signals can also be modulated onto an RF carrier and be transmitted in one or more of the pre-allocated television frequency bands. By allocating one or more T.V. channels for data, the cable television network can readily carry data, such as the data exchanged between computers. Cable data systems provide Internet access to subscribers at speeds that are far greater than dial-up modems.

A cable communications system topology resembles an inverted tree or a directed acyclical graph. The top or upper-most node in a directed acyclical graph (DAG) representing a cable distribution system is the node from which signal information is distributed and is frequently referred to as the cable system head end. Each link in the DAG represents a coaxial cable on which there might be several different frequencydivision multiplexed signals.

One or more cable modem termination systems (CMTS) at or near the head end direct the distribution and collection of data to, and from, cable data system subscribers. At the head end of a cable data system, there are typically hundreds of physical cables that branch out from the head end to and from the system subscribers'homes over a hybrid-fiber coaxial system. Downstream signals are transported on a hybrid-fiber coaxial cable with carrier frequencies centered above the 50 MHz point in the cable spectrum, while upstream signals are transported on a hybrid-fiber coaxial cable with carrier frequencies centered in the 5–42 MHz region of the cable spectrum.

Several different upstream channels can be frequency division multiplexed onto a single cable. In order to recover each channel, the upstream signal must be divided (or split) so that it can be coupled into separate RF band pass filters before being terminated at a unique Physical Interface (PHY) chip. Each PHY chip filters and demodulates the upstream signal for a particular channel to re-create the digital data stream for that channel.

If each upstream channel is transported on a different upstream cable, then a different cable must be used to inject each upstream channel into a unique CMTS upstream connector. In the high-capacity, high-bandwidth CMTS systems of the future, there will be many upstream channels supported by a single CMTS, so this will result in a large number of cables connecting to the CMTS in a relatively small area (yielding very high cable densities). These high cable densities, and the provision of CMTS circuitry to accommodate different system designs, with different numbers of multiplexed channels can be difficult to manage. In order to achieve maximum system flexibility, a CMTS should be able to accommodate different numbers of multiplexed upstream channels on the upstream cables. Even if such capability is provided in a CMTS however, marrying the CMTS to the actual cables has been a serious problem because historically, each upstream channel that is delivered into the CMTS is typically assigned to a unique cable connector on the CMTS. As a result, if N channels are frequency-division-multiplexed on a single upstream cable, then that cable had to be split N times before being connected to the N cable connectors on the CMTS. This splitting is typically performed using splitter circuitry external to the CMTS. After implementing the N splits, a copy of the same signal (with all N of the frequency-division-multiplexed channels) is then injected into each of the N cable connectors on the CMTS. Frequency selective filtering behind each of the N cable connectors select and detects a particular upstream channel out of the N frequency-division-multiplexed channels.

The use of splitter circuitry external to the CMTS results in complicated wiring which adds additional hardware cost and is prone to wiring errors and connector faults. A method and apparatus that integrates this splitter circuitry into the CMTS would be an improvement. Unfortunately, it is not usually known how many unique cables and how many splits will be required at a particular cable TV head-end office. Thus, a method and apparatus by which frequency-division multiplexed signals on different numbers of cables can be easily routed to different numbers of filters would be an improvement over the prior art.

SUMMARY OF THE INVENTION

In a cable data system, upstream frequency-division multiplexed signals that are received at a CMTS on a single cable and which need to be divided (i.e. split), by the individual frequency bands, are routed to CMTS channel interface cards that include band pass filters using a relay matrix. Delivering frequency division multiplexed signals to band-pass filters (so that various signals can be selectively retrieved) is accomplished using a computer-controlled input switch matrix of relays arranged to provide different signal division factors. In the preferred embodiment, the relay matrix is configured to accept any number of input signals (up to eight (8)) and route each of the input signals to as many as eight (8) different pass band filters. Alternate embodiments can route the input signals on a cable to virtually any other number of band pass filter inputs, depending upon the number of signals that are multiplexed together on a particular cable.

DETAILED DESCRIPTION OF THE PREFERRED EMBODIMENT

Figure 1:
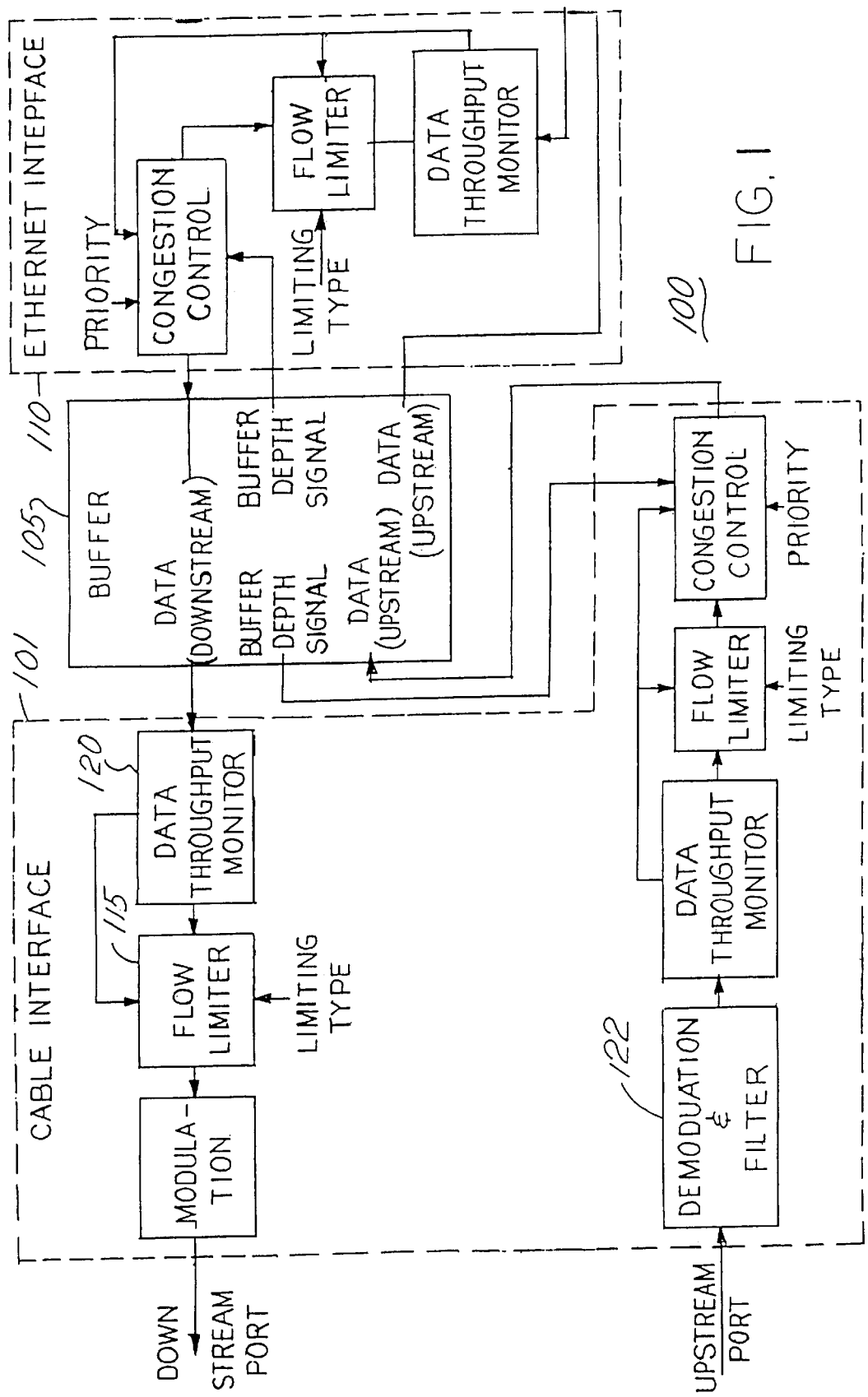
FIG. 1 shows a simplified drawing of a cable modem termination system.

FIG. 1 illustrates a simplified block diagram of a cable modem termination system (CMTS) 100. The CMTS apparatus is comprised of a cable interface (101) that is coupled to a buffer circuit (105). The buffer circuit (105) is coupled to an Ethernet interface ( 110). In the preferred embodiment, each of the individual circuits (101, 105, and 110) resides on separate circuit boards. In alternate embodiments, any circuits having substantially the same function can reside on one circuit board or even one integrated circuit. In other words, the present invention is not limited to three separate circuit boards.

The cable interface (101) is responsible for interfacing the CMTS to the home cable modem apparatus. The cable interface (101) also provides the functions of modulation and demodulation.

The cable interface circuit processes downstream data (data that is sent toward the subscribers) and upstream data (data that is sent from the subscribers). The downstream packet flow path is comprised of a data throughput monitor (120) that is coupled to a flow limiter (115). The data throughput monitor (120) has an input that is coupled to the buffer circuit (105) from which the downstream data packets flow.

Upstream data is received at a demodulator/filter circuit 122, the functions of which include the extraction of data signals modulated onto different frequency carriers that are multiplexed together to be carried together on a single cable. Band-pass filters, to which an upstream cable is connected and which can carry several frequency-division multiplexed signals, each of which carries different subscriber data, selectively recover individual data streams from the cable.

Figure 2:
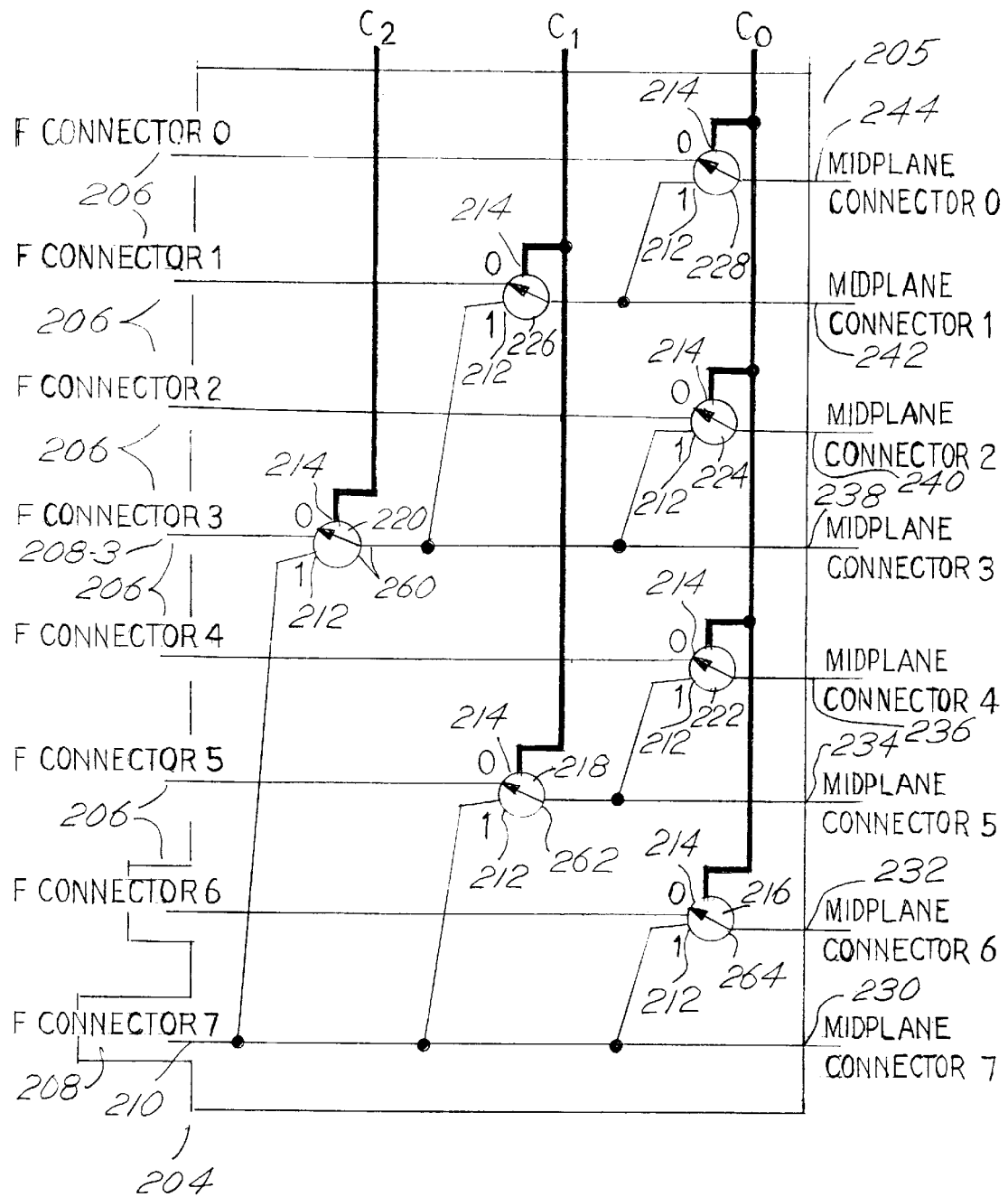
FIG. 2 shows a signal splitter relay matrix for splitting cable data signals for delivery to multiple different outputs.

FIG. 2 shows a simplified representation of a system of a signal splitter matrix 100 for use with a CMTS, such as the CMTS depicted in FIG. 1. The circuitry for the signal splitter matrix 200 resides on a single circuit card 202 such that it can be installed into the CMTS 100 backplane connector and present on one edge 204 of the circuit card, several F-type coaxial connectors, only the center conductors 206 of which are schematically represented in FIG. 2.

A second edge connector 205 is provided with eight (8) output terminals. A network of relays between the input coaxial connectors and the output terminals direct the distribution of upstream signals on a cable data system to filter circuits 122 in the cable interface 101 of the CMTS. The relays facilitate expeditious distribution of different numbers of frequency division multiplexed signals on a cable in a cable data system, to a corresponding number of different output terminals, each of which can be connected to a particular band-pass filter. As the number of frequency-division multiplexed (FDM) signals on a cable changes, the relays allow the FDM signals to be routed to a correspondingly different number of output terminals and, correspondingly, to different numbers of filters.

By energizing one or more relays 216, 218, 220, 222, 224, 226 and 228 on the circuit card 200, a signal input on a particular F-type edge connector is copied (or routed) to one or more output connectors 230, 232, 234, 236, 238, 240, 242, 244. In the preferred embodiment of a Cadant, Inc. DOCSIS-compliant cable modem termination system (CMTS), as shown in FIG. 1, signals on the output connectors are coupled to the frequency-selective (band-pass) filters on cable interface circuit board whereas the band-pass filters 122 are located to de-multiplex the frequency-division multiplexed signals that were input on a particular cable, coupled to a particular F-connector on the front edge 204 of the circuit card 200.

With respect to a first F-connector 208-7 on the card edge 204, its center conductor 210 is electrically connected to a first switched terminal 212 of relay 220, which has two such switched terminals (212, 214) and a common terminal 260 coupled to yet two other relays 226, 224 and to the midplane connector 238. With respect to relay 220, its other switched terminal 214 is connected to the center conductor of a different input F connector, 208-3 such that the frequency division multiplexed cable data system signals on either F connector 208-7 or 208-3 can be selectively routed to the common terminal 260 of relay 220 depending upon the state of relay 220, as determined by the state of control line $C_2$. Stated alternatively, cable data signals on F connector 208-3 or 208-7 can be routed to output edge connector 238 depending upon the state of control line $C_2$.

Depending upon the state of relays 228, 226 and 224, relay 220 selects signals from either F connectors 208-3 and 208-7 to be distributed to any or all of several different output terminals 244, 242, 240, 238, 236, 232 or 230. (The state of control lines $C_2$, $C_1$ and $C_0$ to open or close a particular relay is a design choice. Inasmuch as some relays might be normally open and others normally closed, depending upon one's frame of reference, a control line might need to be energized for one type of relay to toggle a signal yet de-energized for another type of relay to toggle a signal.) By way of example, if control lines $C_2$, $C_1$ and $C_0$ are appropriately energized, upstream cable data system signals at connector 208-7 are routed to all of the outputs 230, 232, 234, 236, 238, 240, 242 and 244. By changing the control signals $C_2$, $C_1$ and $C_0$, a signal (or signals) on input connector 208-7 is (are) routed to only outputs 230 and 232, or to outputs 230, 234. Other combinations include 230 and 238; 230, 232 and 234; 230, 234 and 238, etc.

As can be seen in FIG. 2, the center conductor 210 of the first F-connector 208 is also connected to the first switched terminals 212 of two other relays 218 and 216 the respective center conductors of which 262, 264 are connected respectively to yet another relay 222 and edge connector 232. By controlling the relay control lines, frequency-division multiplexed signals can be routed to numerous output terminals. In a CMTS, the signals presented at the output terminals can be appropriately filtered (and demodulated) to recover upstream data signals from cable data system subscribers.

Those skilled in the art will appreciate that the number of outputs to which an input can be routed is virtually unlimited. By adding more relays, more relay control lines and more output terminals, a single input might be routed to a virtually unlimited number of outputs.

Those skilled in the art will also realize that signals on the control lines can be generated manually or automatically under the control of a processor. Inasmuch as processor control lines are well known in the prior art, depiction of a computer controller for the control lines $C_2$, $C_1$ and $C_0$ is omitted for clarity.

It should also be appreciated by those skilled in the art that by use of a relay matrix in a cable modem termination system, physical cable installation and system maintainability is increased over the prior art techniques in that CMTS system design flexibility is enhanced.

What is claimed is:

1. Apparatus for routing a plurality of frequency division multiplexed cable data system signals within a CMTS, each signal having a carrier frequency, comprising:

a relay matrix comprised of a plurality of relays, said relay matrix further having at least a first input connection and a plurality of output connections connected to a midplane within the CMTS, such that the cable data input signals on said at least first input connection can be selectively routed to a number of said plurality of output connections according to the state of relays of said plurality of relays, wherein said state of relays is determined based on the carrier frequency or frequencies of the cable data system signals being input to the at least first input connection.

2. The apparatus of claim 1 wherein said relay matrix is comprised of at least one input and up to eight output connections.

3. The apparatus of claim 1 wherein said relay matrix is further comprised of a plurality of control signal inputs for said relays.

4. The apparatus of claim 1 further including at least one coaxial cable connector coupled to said at least a first input.

5. A cable modem termination system comprised of:
   a. a cable interface, said cable interface having at least one band pass filter to selectively recover at least one signal from a plurality of frequency-division multiplexed signals on a cable;
   b. a relay matrix comprised of a plurality of relays, said relay matrix further having at least a first input and at least one output coupled to said at least one band pass filter by which cable data input signals on said first input can be selectively routed to a number of said plurality of outputs according to the state of relays of said plurality of relays.

6. The apparatus of claim 5 wherein said cable interface is comprised of a plurality of band pass filters and a said relay matrix is comprised of a plurality of outputs.

7. The apparatus of claim 5 wherein said relay matrix is further comprised of a plurality of control signal inputs for said relays.

8. The apparatus of claim 5 further including at least one coaxial cable connector coupled to said at least a first input.

9. The apparatus of claim 1 wherein each midplane connection is coupled to a bandpass filter for selectively passing a signal having a desired carrier frequency to other components within the CMTS.

10. A method for routing one or more multiplexed upstream signals within a CMTS, each of the one or more multiplexed upstream signals containing at least one signal having a carrier frequency, and if one of the one or more upstream multiplexed signals contains more than one signal, each of the contained signals having a carrier frequency different from the others contained therein, comprising:

receiving the multiplexed signals at one or more upstream inputs of a CMTS; and configuring a plurality of relays, the relays being connected between the one or more upstream inputs and a plurality of midplane connections, each midplane connection coupled to a bandpass filter and each relay having at least two switchable inputs for selectively receiving the multiplexed upstream signal from one of at least two of the upstream inputs of the CMTS, such that the upstream multiplexed signal received at any one of the upstream inputs of the CMTS is routed to at least one of the midplane connections coupled to a bandpass filter having a center frequency corresponding to one of the carrier frequencies of one of the signals contained therein.

11. The method of claim 10 wherein the input of each relay for receiving a multiplexed upstream signal is selected with a control signal.

12. The method of claim 11 wherein a first control signal selects the inputs of a first, second, third and forth relay, a second control signal selects the inputs of a fifth and sixth relay, and a third control signal selects the input of seventh relay.

* * * * *